United States Patent [19]

Chapman et al.

[11] 4,318,888
[45] Mar. 9, 1982

[54] WOUND FOIL STRUCTURE COMPRISING DISTINCT CATALYSTS

[75] Inventors: Lloyd R. Chapman, St. Clair Shores; Charles W. Vigor, Rochester; John F. Watton, Mt. Clemens, all of Mich.

[73] Assignee: General Motors Corporation, Detroit, Mich.

[21] Appl. No.: 168,436

[22] Filed: Jul. 10, 1980

[51] Int. Cl.³ .................... B01D 53/36; F01N 3/10
[52] U.S. Cl. .......................... 422/180; 29/157 R; 252/466 B; 252/477 R; 423/213.5
[58] Field of Search ............ 422/180; 252/466 B, 252/477 R; 423/213.5; 29/157 R, 163.5 CW, 163.5 R, 163.5 F

[56] References Cited

U.S. PATENT DOCUMENTS

| 3,755,534 | 8/1973 | Graham | 422/180 X |
| 3,891,575 | 6/1975 | Brautigam et al. | 252/477 R X |
| 3,992,330 | 11/1976 | Noakes et al. | 252/477 R X |
| 4,078,898 | 3/1978 | Fedor et al. | 422/180 X |
| 4,091,072 | 5/1978 | McArthur | 423/213.5 |
| 4,106,913 | 8/1978 | Bunda et al. | 422/180 |
| 4,118,199 | 10/1978 | Volker et al. | 422/180 X |
| 4,186,172 | 1/1980 | Scholz | 422/180 |
| 4,220,625 | 9/1980 | Toh et al. | 422/180 |
| 4,225,561 | 9/1980 | Torres | 422/180 X |

FOREIGN PATENT DOCUMENTS

| 50-145382 | 11/1975 | Japan | 422/180 |
| 1052103 | 12/1966 | United Kingdom | 422/180 |

Primary Examiner—Richard L. Chiesa
Attorney, Agent, or Firm—Douglas D. Fekete

[57] ABSTRACT

A preferred catalytic converter structure suitable for treating automotive exhaust gases comprises a wound corrugated metal foil and gas passages defined by facing foil surfaces of adjacent turns, wherein one surface carries platinum catalyst and the facing surface separately carries palladium catalyst for concurrently treating gases flowing therethrough. A preferred method for manufacturing said structure comprises applying platinum catalyst and palladium catalyst to distinct halves in length of both foil surfaces, which halves border along a transverse axis, and winding the foil about the axis to bring the surfaces into facing relationship.

3 Claims, 8 Drawing Figures

WOUND FOIL STRUCTURE COMPRISING DISTINCT CATALYSTS

This invention relates to an improved monolith-type automotive catalytic converter comprising a wound foil structure carrying distinct catalysts strategically located for concurrently treating exhaust gases flowing therethrough. More particularly, this invention relates to a wound foil structure wherein facing foil surfaces form gas-conveying passages and carry different catalyst compositions.

One method for manufacturing a monolith-type catalytic converter comprises suitably winding a corrugated and coated metal foil so that the corrugations form gas flow passages. The preferred foil is composed of a high temperature corrosion-resistant ferritic stainless steel alloy containing aluminum. The foil is preferably oxidized to cover the surfaces with integrally grown, densely spaced alumina whiskers and thereafter coated with a gamma alumina material suitable for impregnation with a catalyst.

Thorough exhaust treatment is carried out using a combination of catalysts, typically platinum, palladium and rhodium. However, when platinum and palladium are present on the same alumina surface, the metals interact in a manner that substantially reduces their individual effectiveness. Therefore, platinum and palladium are preferably applied to separate surfaces. For monolith-type converters, the metals have been applied heretofore to discrete longitudinal zones arranged in series on one or more structures. Thus, exhaust treatment in monolith-type converters has heretofore been limited to successive action by different catalyst compositions.

Therefore, it is an object of this invention to provide a monolith-type catalytic converter comprising two distinct catalyst compositions separately distributed for treating continuously and concurrently automotive exhaust gases, and a method for manufacturing said converter. 1

It is a further object of this invention to provide an automotive catalytic converter comprising a wound foil structure having gas passages defined by foil surfaces of successive turns, which surfaces carry different catalyst compositions. Mutually antagonistic catalyst compositions are separated to optimize their effectiveness and are disposed for concurrently treating gases.

It is also an object to provide a method for manufacturing a converter structure comprising corrugating a metal foil, applying at least two different catalyst compositions to selected surfaces thereof, and suitably winding so that the corrugations form gas passages and the facing foil surfaces carry distinct catalyst compositions.

SUMMARY OF THE INVENTION

In a preferred embodiment, a catalytic converter structure is manufactured by applying a platinum catalyst to substantially one half in length and a palladium catalyst to the remaining half of both surfaces of an alumina-coated metal foil, and suitably winding the foil to form a generally cylindrical structure having axial gas passages defined by facing foil surfaces that carry the different catalysts. The foil is several times longer than wide and the catalysts are separated by a transverse boundary. The foil also comprises transverse zig-zag corrugations. The foil is folded and wound about the boundary so that the corrugations of successive turns cooperate to form the gas passages. In addition, the outer surface of one turn and the inner surface of the next turn, which surfaces define the passages, comprise different halves of the same foil surface and thus carry different catalysts. Therefore, platinum and palladium catalysts are maintained separate to prevent mutual interference. Also, the catalysts are strategically distributed to act substantially concurrently upon gases flowing through the passages throughout the entire length of the structure.

DETAILED DESCRIPTION OF THE INVENTION

In a preferred embodiment, an automotive catalytic converter is formed by folding and winding a metal foil having an alumina coating that is selectively impregnated with platinum and palladium catalysts. The foil consists of, by weight, 15% chromium, 4% aluminum, 0.5% yttrium and the balance iron, and is conveniently designated Fe-Cr-Al-Y or Fecralloy. The foil is peeled from a rotating cylindrical billet by feeding a durable tungsten carbide cutting tool into the rotating surface to cut or peel away a continuous thin metal strip. The strip is pulled away from the billet surface under controlled tension to form a foil having irregular and severely worked surfaces. Several parameters including the billet rotating speed, the cutting tool feed rate and the tension pulling the strip are adjusted to produce a foil thickness of about 50 microns. The peeled foil is about 7.6 cm wide and cut to a preferred length of about 22.9 meters for forming a corrugated foil 18.3 meters long. Any cooling fluid applied during peeling is suitably cleaned away.

Figure 1:
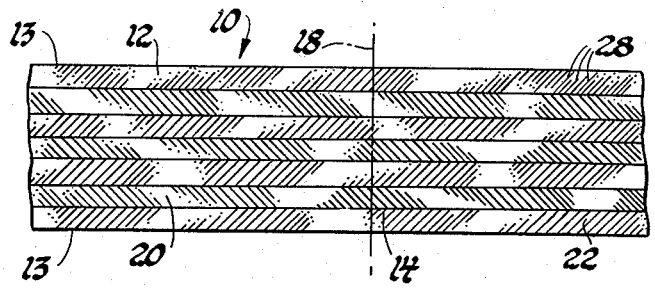
FIG. 1 is a plan view of a portion of corrugated and coated metal foil for manufacturing the preferred structure of this invention.

The peeled foil is annealed for one minute at 900° C. in air and corrugated by passing between a pair of driven rollers carrying mating teeth arranged in a zig-zag pattern to form a zig-zag or herringbone corrugation pattern in the foil, which pattern is illustrated in FIG. 1. The corrugations are about 0.76 mm in height and 1.78 mm in pitch (peak-to-peak dimension). The segments of the zig-zag pattern are oriented about 10° from perpendicular to the foil edges and are about 1.25 cm long. Any lubricant is cleaned away. The foil is preferably coiled to facilitate handling. During subsequent operations, the foil may be either loosely coiled to avoid metal-to-metal contact, particularly during furnace heating, or uncoiled and recoiled to provide access to the foil surface, particularly during coating operations. Preferably, coiling is carried out by folding and winding the foil, as hereinafter described, into substantially the shape of the desired catalytic converter structure.

The foil is heated for 8 hours at 930° C. in a circulating air atmosphere to grow high-aspect alumina whiskers that substantially cover the foil surfaces and improve adhesion of a subsequent ceramic coating to the metal. The whiskered surface is primed by spraying an alumina gel formed by mixing 5.0 parts by weight colloidal alpha alumina monohydrate, $Al_2O_3 \cdot H_2O$, with 95 parts deionized water and adding concentrated nitric acid, $HNO_3$, to lower the pH below about 2.0. While still wet, the primed surface is spray-coated with a gamma alumina powder dispersed in a similar, but less viscous gel comprising 3.0 parts by weight colloidal alpha alumina monohydrate in 97 parts water and nitric acid-stabilized below pH 2.0. The gamma alumina powder preferably has a porosity greater than about 1 cc pores per gram and a surface area greater than about 100 square meters per gram. About 70% of the particles are sized less than 200 mesh and greater than 325 mesh, and the balance are smaller than 325 mesh. The preferred coating material is prepared by uniformly mixing 27 parts by weight of gamma alumina particles to about 100 parts gel, so that the dried coating is about 90% by weight gamma alumina. Although the colloidal alumina loses its alpha character in the gel, the gamma alumina survives as discrete particles having the desired high surface area. The first coat is air-dried and two to five additional coats of the particle-containing material are spray-applied and air-dried to produce a total coating thickness between 40 to 50 microns. The coating is calcined for four hours at 550° C. in air, during which noxious $NO_2$ fumes are driven off. The product substantially gamma alumina coating is tightly adherent and suitable for impregnation with noble metal catalysts.

The gamma alumina coating is impregnated with a combination of base metals including barium, which stabilizes gamma alumina and also a noble metal dispersion, and cerium which enhances oxygen storage. An aqueous solution containing 0.03 g/ml barium nitrate and 0.05 g/ml cerium nitrate is sponge wiped onto both foil surfaces evenly at a rate of about 1 milliliter per gram of alumina coating. The foil is calcined for four hours at 550° C. The resulting coating contains about 2 weight percent barium in oxide form and about 2 weight percent cerium in oxide form.

Figure 2:
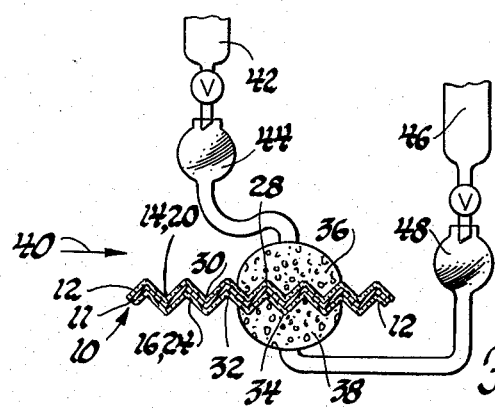
FIG. 2 is a schematic view of a strip-coating apparatus for applying catalyst compositions to a foil in accordance with the preferred embodiment of this invention.
Figure 3:
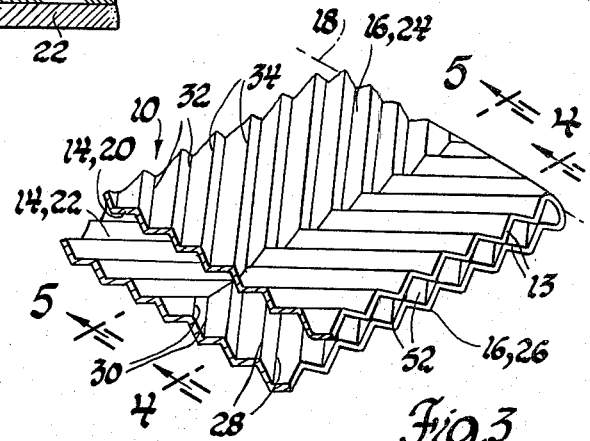
FIG. 3 is a perspective view of a portion of the foil in FIG. 1 after folding.

Referring to FIGS. 1, 2 and 3, the preferred coated, corrugated foil 10 comprises a metal substrate 11 coated with alumina layers 12. Foil 10 features edges 13, a first surface 14 and a second surface 16. A transverse folding axis 18 lying perpendicular to edges 13 divides first surface 14 lengthwise into a first half 20, and a second half 22, and similarly divides second surface 16 into a first half 24 and a second half 26, lying opposite halves 20 and 22, respectively. Axis 18 does not divide foil 10 exactly in half, but is shifted slightly so that first halves 20 and 24 are 9.3 meters long and second halves 22 and 26 are 9.0 meters long. The difference provides about a one full turn overlap after winding and produces a rounder structure.

As described hereinabove, foil 10 is corrugated in a zig-zag pattern. As seen in FIG. 2, corrugated first surface 14 comprises peaks 28 and troughs 30 that lie immediately opposite troughs 32 and peaks 34, respectively, of the second surface 16.

In accordance with this invention, the gamma alumina coating on foil 10 is impregnated with two distinct noble metal compositions. A solution of a first composition is prepared by volumetrically dissolving about 1.4 gram tetraamineplatinum(II) chloride and about 0.11 gram pentaaminerhodium(III) chloride in 125 ml water. These amine complex weights correspond to 0.8 gram (0.025 troy ounce) platinum and 0.04 gram (0.00125 troy ounce) rhodium. A second solution is similarly prepared by volumetrically dissolving about 0.76 gram tetraaminepalladium(II) chloride and about 0.11 gram pentaaminerhodium(III) chloride in 125 ml water, corresponding to 0.3 gram (0.01 troy ounce) palladium and 0.04 gram (0.00125 troy ounce) rhodium.

The catalyst solutions are applied to foil surfaces 14 and 16 using sponge applicators 36 and 38 adapted to wipe opposite foil surfaces, as shown in FIG. 2. The platinum-rhodium solution is metered from a burette 42 into a bulb 44 that is connected to applicator 36. Bulb 44 holds a constant volume of solution to continually soak applicator 36 at a controlled solution pressure and thereby apply solution at a predetermined rate. Similarly, palladium-rhodium solution is metered from a second burette 46 into a second bulb 48 connected to applicator 38. Bulb 48 maintains constant solution flow, similar to bulb 44. As seen in FIG. 2, foil 10 is initially pulled in the direction of arrow 40 so that applicator 36 is sponging platinum-rhodium solution onto the first half 20 of first surface 14 and applicator 38 is sponging palladium-rhodium solution onto first half 24 of second surface 16. However, upon reaching axis 18, foil 10 is turned over so that applicator 36 sponges platinum-rhodium solution onto second half 26 of second surface 16 and applicator 38 sponges palladium-rhodium solution onto second half 22 of first surface 14. The entire solution volumes are applied evenly to the selected surfaces. Thereafter, the coating is air dried and calcined for four hours at 550° C. in an atmosphere consisting of 4% by volume hydrogen and 96% nitrogen. Calcining destroys the amine complex salts and reduces the noble metals to their elemental and catalytically active state.

Figure 5:
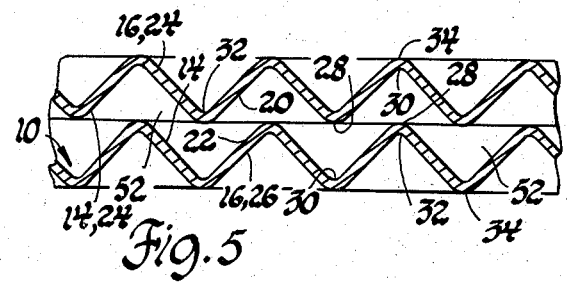
FIG. 5 is a cross-sectional view taken along line 5—5 of FIG. 3 and showing an arrangement of corrugations along said line.
Figure 6:
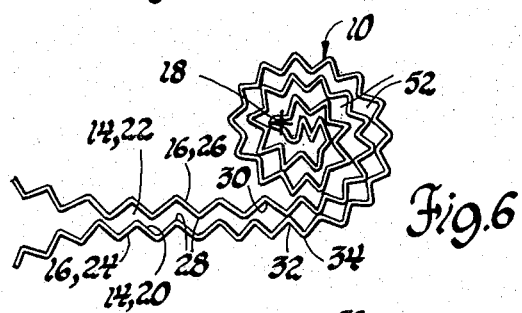
FIG. 6 is an end view of the folded foil in FIG. 3 after being partially wound.
Figure 7:
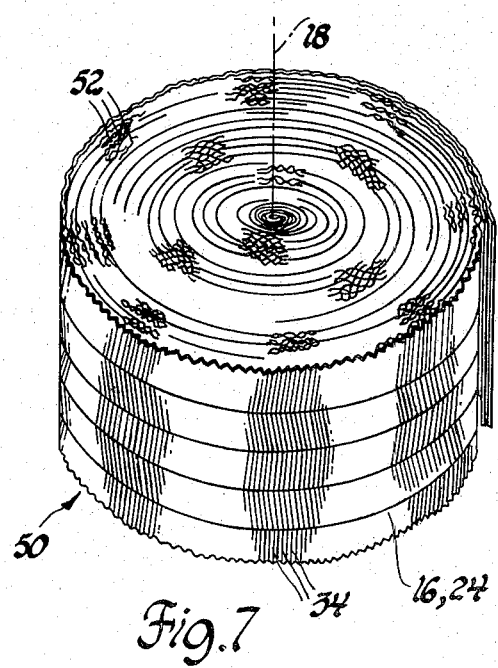
FIG. 7 is a perspective view of the preferred wound foil structure of this invention.

Referring to FIGS. 3 through 7, the catalyst-bearing foil 10 is folded and wound into a preferred catalytic converter structure 50 in FIG. 7. (To aid in understanding the Figures, metal substrate 11 and coating layers 12 are not separately illustrated.) Referring to FIG. 3, foil 10 is bent about axis 18 to fold the foil in half lengthwise so that first half 20 of the first surface 14 faces second half 22. Because of the oblique orientation of peaks 28 and troughs 30 in the zig-zag pattern, they cannot nest upon folding, but cross to form passages 52.

Figure 4:
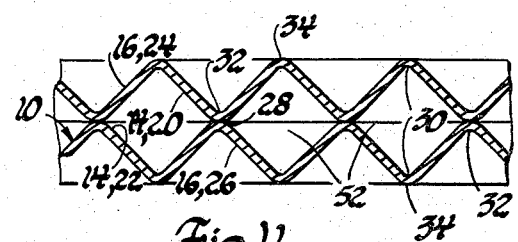
FIG. 4 is a cross-sectional view taken along line 4—4 in FIG. 3, and showing an arrangement of corrugations along said line.

FIG. 4 shows a portion of folded foil 10 along a cross-sectional plane wherein corrugation peaks 28 contact. Along other planes, peaks 28 lie in juxtaposition to troughs 30, as depicted in FIG. 5, but are prevented from nesting by peak-to-peak contact in planes such as in FIG. 4. Since first half 20 carries platinum-rhodium catalyst and the second half 22 carries palladium-rhodium catalyst, passages 52 feature different catalyst compositions on opposite surfaces.

After folding, first half 24 of second surface 16 lies opposite second half 26 and both face outwardly. Foil 10 is then wound about axis 18; i.e., the bight of the fold, so that first half surface 24 is outside the second half surfaces 26, as depicted in FIG. 6. During winding, first half 24 of second surface 16 is caused to face second half 26 and the corrugation peaks 34 cross to form additional passages 52 in a manner similar to folding. Since the first half 24 carries palladium-rhodium catalyst and the second half carries platinum-rhodium catalyst, passages 52 formed by winding also feature opposite surfaces bearing different catalysts. Foil 10 is completely wound into converter structure 50 in FIG. 7. Structure 50 is suitable for incorporation into an automotive exhaust system for treating gases flowing therein. Gases flow through passages 52 and concurrently contact distinct platinum catalyst and palladium catalyst separately distributed on opposite surfaces therealong.

Figure 8:
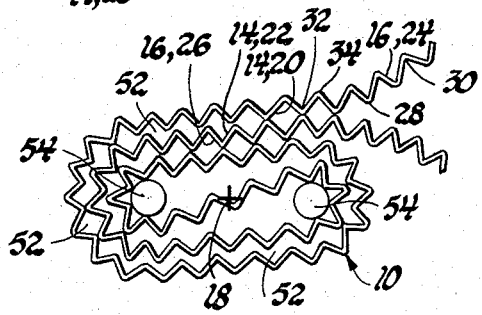
FIG. 8 is an end view of the foil in FIG. 1 partially wound in accordance with an alternate embodiment of this invention.

In a preferred embodiment, foil 10 is folded and wound in separate steps to form a preferred converter structure 50 in FIG. 7. In an alternate embodiment, a structure is formed without a distinct folding step. Referring to FIG. 8, foil 10 is looped about two posts 54 in an "S"-pattern with axis 18 therebetween. The posts are then revolved about axis 18 to wind foil 10 into a converter structure. The structure is substantially identical to structure 50 in FIG. 7, but is more elliptical in cross section, depending upon the distance between posts 54. This winding operation brings first half 20 of first surface 14 to face second half 22 and first half 24 of second surface 16 to face the second half 26. Since half surfaces 20 and 26 carry platinum catalyst and half surfaces 22 and 26 carry palladium catalyst, gas passage through the structure feature different catalysts on separate and opposite surfaces, in accordance with this invention.

In the described embodiments, rhodium and the base metals are distributed uniformly over all foil surfaces. The catalytic efficiency of rhodium is believed optimized at low concentrations. However, rhodium tends to sinter or alloy with platinum and may advantageously be separated on opposite passage surfaces from platinum by this invention. Similarly, cerium tends to adversely react with platinum. Different base metal compositions may be applied to discrete foil surfaces so that cerium is present with palladium but separated from platinum. Thus, this invention may be adapted to prepare distinct foil surfaces to receive particular catalysts. Further advantages may be obtained using other catalysts and other base metals.

Although zig-zag corrugations are preferred, similar passages are formed by winding foils having straight corrugations that are oblique to the foil edges. Suitable passages are also produced by alternating turns of corrugated foils and flat foil. In another embodiment, suitable structures are formed by winding together two foils rather than folding over a single foil. An advantage of two foils is that the catalyst compositions may be readily applied to a continuous strip that is subsequently cut to the desired length.

Although this invention has been described in terms of certain embodiments throughout, it is not intended to be limited to the above description, but rather only to the extent set forth in the claims that follow.

The embodiments of the invention in which an exclusive property or privilege is claimed are defined as follows:

1. A catalyst-bearing structure for catalytically treating a gas and comprising a catalytically coated metal foil formed so as to define a gas passage comprising a first foil surface and a second foil surface in facing relationship, said first surface carrying a catalyst and said second surface carrying a catalyst different from the first catalyst for concurrently contacting gases flowing therethrough.

2. A catalytic converter structure for treating gases flowing through a passage therein, said structure comprising a wound corrugated foil and a gas passage defined by an outer foil surface of a layer and an inner foil surface of an adjacent layer, said outer surface carrying at least a first catalyst and said inner surface carrying at least a distinct second catalyst, said catalysts being carried on facing surfaces and cooperating to effectuate a desired treatment of gases flowing through said passage.

3. A catalytic converter structure for treating automotive exhaust gases caused to flow through a passage therein, said structure being generally cylindrical and comprising a wound corrugated alumina-coated metal foil and an axial gas passage defined by an outer foil surface of a turn and an inner foil surface of a next successive turn, said outer surface carring one catalyst selected from the group consisting of platinum and palladium and said inner surface separately carrying the other catalyst from said group for concurrently treating gases flowing through the passage.

* * * * *